United States Patent
Blair (10) Patent No.: US 6,738,824 B1
(45) Date of Patent: May 18, 2004

(54) DIAL-OUT LINK SELECTION VIA STATIC ROUTE REDISTRIBUTION

(75) Inventor: Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/479,527

(22) Filed: Jan. 7, 2000

(51) Int. Cl.[7] .................................................. G06F 15/173
(52) U.S. Cl. ....................... 709/238; 709/238; 709/239; 370/352; 370/260
(58) Field of Search ................................. 709/227, 228, 709/238, 235, 239; 370/352, 260; 340/352; 359/352

(56) References Cited

U.S. PATENT DOCUMENTS

| | | | | |
|---|---|---|---|---|
| 5,918,019 | A | | 6/1999 | Valencia ................ 395/200.57 |
| 6,081,518 | A | * | 6/2000 | Bowman-Amuah ......... 370/352 |
| 6,144,727 | A | * | 11/2000 | Mashinsky ................... 379/112 |
| 6,147,987 | A | | 11/2000 | Chau et al. .................. 370/352 |
| 6,215,776 | B1 | * | 4/2001 | Chao ............................ 370/316 |
| 6,233,232 | B1 | | 5/2001 | Chau et al. .................. 370/352 |
| 6,278,705 | B1 | | 8/2001 | Chau et al. .................. 370/352 |
| 6,282,281 | B1 | * | 8/2001 | Low .............................. 379/230 |
| 6,295,292 | B1 | * | 9/2001 | Voit et al. .................... 370/352 |

* cited by examiner

Primary Examiner—Rupal Dharia
Assistant Examiner—Adnan Mirza
(74) Attorney, Agent, or Firm—Hamilton, Brook, Smith & Reynolds, P.C.

(57) ABSTRACT

Dial-out route service is forwarded by a gateway to reduce congestion in a data communication network. The first gateway determines availability of it ports to provide dial-out service to a dial-out route. If the first gateway is unable to provide dial-out service to the dial-out route, then the first gateway transfers information corresponding to the dial-out route to a second gateway. The second gateway may access a central database storing static routes corresponding to the transferred dial-out route information. The central database is typically stored on a server providing security services, which may include access, authentication, and authorization. The second gateway advertises the transferred dial-out route and a respective priority level to effectuate the dial-out route transfer. The dial-out route may be terminated based on one or more termination parameters. In an alternate embodiment, a network node determines the first gateway's state of congestion corresponding to the first gateway's ability to provide dial-out route service. The node transfers the dial-out route to a second gateway. The node may continually monitor the first gateway to determine when to restore the transferred dial-out route. Forwarding dial-out route service may be used to dynamically scale dial-out service provided by a gateway.

39 Claims, 4 Drawing Sheets

DIAL-OUT LINK SELECTION VIA STATIC ROUTE REDISTRIBUTION

RELATED APPLICATION(S)

This application is related to U.S. Patent Application entitled "Method and Apparatus Providing Dial On Demand Scaling," by Dana Blair, filed Mar. 30, 1999, Application Ser. No. 09/281,591 incorporated herein in its entirety by reference herein.

BACKGROUND OF THE INVENTION

Users of network devices connected to networks, such as the Internet, access remote devices, such as web servers, to provide the users with information. Between the user's network device and the remote devices are various networks, PSTNs (Public Switched Telephone Network), routers, subnet devices, etc. One device that allows users to connect to a PSTN is a device referred to as a gateway (GW), or Network Access Server (NAS), which is typically a router providing various network communication protocols, such as ISDN (Integrated Services Digital Network), POTS (Plain Old Telephone System), and other modem and non-modem communication protocols. At various locations around a network are nodes, which can transmit and/or receive communications to/from other nodes on the network. Nodes include devices such as computers, routers, telephones, cell-phones, fax machines, hand-held network devices, etc., and/or software, residing on any of the aforementioned devices, and multiple software modules, in cases where software operates in parallel on a single device.

A typical GW has a fixed number of ports, one hundred, for instance. Each port allows both dial-in and dial-out service. Once a port is allocated for dial-in service, the port remains so until the connection from a node to the GW (or, more precisely, from a first node to a second node via the GW) is released. The same is true for a port allocated for dial-out service, where the port remains allocated for dial-out service until the connection from the GW to a remote network node is released. For example, a port is allocated for dial-in service when a node, such as a web browser, dials into the GW to access a remote web server to which the GW provides service. A GW port is allocated for dial-out service when connection is made from the GW to a node, such as a web server, to which the GW provides access, possibly through other nodes, such as routers.

Dial-in service is a relatively mature technology. Dial-in service technology presently allows connections to non-allocated ports to be established automatically. An example of dial-in service technology is a so-called "hunt" algorithm, which is commonly used in automated 1-800-telephone systems. When a call is received at a 1-800-service center, a non-allocated port is automatically allocated to the incoming call. This automated connectivity technology allows service providers (e.g., Internet service providers (ISPs)) to over-subscribe the number of users subscribed to access the Internet through the ISP's GW. Over-subscription of dial-in service is possible because of the mature automated connectivity technology and an assumption that not all of the subscribed users will attempt to connect through the GW at the same time. ISPs may over-subscribe dial-in service customers to GW ports by a ratio of 5, 10, 15, or more, to 1. In the event that all GW ports are being used, further dial-in customers receive a "connection failure" message, though this case has become rare due to the above-described dial-in service technology.

Dial-out service is not as mature a technology as dial-in service. In dial-out service, a GW has a static route table of nodes that are reachable by the GW. But, because the GW has a limited number of ports, GWs typically assign/reserve ports for dial-out service to specific routes or nodes. In that way, when nodes dial-in and request dial-out service to other nodes, the GW has ports available for the dial-out service.

If a PSTN network is coupled to fifty remote subnets, for example, the GW's ,static route table includes information to access each of the fifty remote subnets. However, because the GW has a limited number of ports, as discussed above, the ISP must make some decisions about GW configuration in order to prevent customers attempting to use dial-out service from receiving a "connection failure/remote server busy" or other such message. To this end, ISPs typically have one GW configured to provide only dial-in service and several (more than necessary) GWs to provide dial-out service.

SUMMARY OF THE INVENTION

The problem is that, presently, GWs are not inherently flexible in their scalability and fail-safe operation. Each GW has its own static route table, but is unable to share dial-out route entries in the static route table with other GWs to dynamically scale the number of ports available to support its static route table entries. Without such dynamic scalability, ISPs must have an over-abundance of GWs to support expected peak usage, which is increasing at a rapid pace with the emergence of web-based, hand-held devices, including wireless phones, and one-to-many media distributions by information providers to end users. Each hand-held device requires a dial-out service port, and each information provider requires access to each media distribution destination via a dial-out service port. GWs are expensive pieces of equipment, so it is in the ISP's best interest to have GWs be flexible such that the number of GWs dedicated to dial-out service is minimized, but optimized.

The present invention includes forwarding dial-out service provided by a gateway to reduce congestion in a data communication network. For network nodes that access a first gateway for dial-out service, the first gateway determines availability of ports providing dial-out service. Information corresponding to a dial-out route that is determined by the first gateway to be causing congestion, or will be causing congestion in the future, is transferred from the first gateway to a second gateway. Transferring the dial-out route information allows the gateways to forward dial-out service. Static route transfers among gateways may also result in dynamically, and automatically, scaling dial-out service provided by the first gateway.

The second gateway may access a central database storing static routes corresponding to the transferred dial-out route information. The central database is typically stored on a server providing security services. These security services may include access, authentication, and authorization.

The first gateway may issue a request to the second gateway prior to transferring the dial-out route. The first gateway determines whether the second gateway wishes to accept the dial-out route. The first gateway may also transfer a respective priority level parameter associated with the dial-out route. Upon accepting the dial-out route, the second gateway advertises the transferred dial-out route and a respective priority level to effectuate the dial-out route transfer. In addition to transferring an optional respective priority level parameter, the first gateway may also transfer a termination parameter to limit dial-out route transfer time. The termination parameters may include a time-to-live parameter, delete-after-complete parameter, or delete-upon-reboot parameter.

In an alternate embodiment, a network node, which is typically another gateway or central gateway monitor, determines a state of dial-out route service of the first gateway. The network node retrieves at least one dial-out route reachable from the first gateway from a central database storing static routes. The retrieved dial-out route is assigned to another gateway to provide service to the dial-out route. The node continually re-assesses the state of dial-out route service of the first gateway to restore the retrieved dial-out route. This embodiment monitors gateways to ensure they are functioning properly and provides uninterrupted dial-out service to routes supported by the first gateway until such time as the first gateway can again provide dial-out route service to the retrieved dial-out route.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
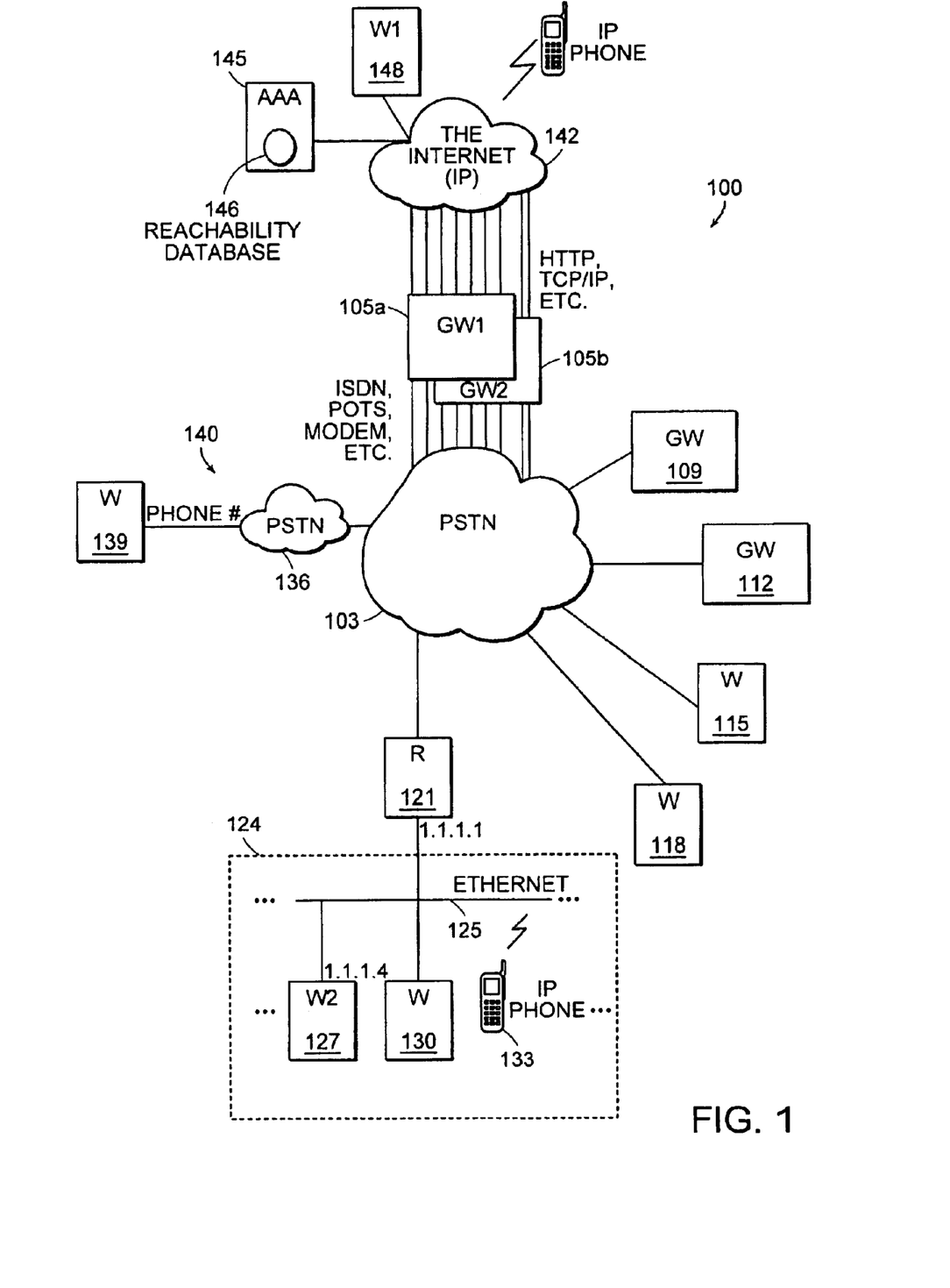
FIG. 1 is a block diagram of an example network in which the present invention is deployed.

FIG. 1 is a block diagram of an example network in which the present invention may be deployed. In the network 100, a PSTN 103 is coupled to the Internet 142 by a pair of gateways (GWs) 105a, 105b. The GWs 105 have access to an AAA (access, authentication, and authorization server) 145 via the Internet 142. The GWs 105 provide dial-in and dial-out service for the nodes coupled to the Internet 142 and PSTN 103. The GWs 105 provide ISDN, POTS, modem, etc. communication protocols to couple the nodes, which operate under the different communication protocols. Network nodes include computers, VoIP phones, hand-held devices (e.g. palm-top computers), network appliances, fax machines, or software performing communication on a network device. A network node sometimes loosely refers to a subnet, PSTN, or other set of network devices that can be referenced as a single entity.

The PSTN 103 is coupled either electrically (over wire or fiber optic) or wirelessly (via RF or optically) with network nodes. Network nodes coupled to the PSTN 103 include router 121, PSTN 136, and the Internet 142 (via the gateways 105). There are also several nodes connected directly to the PSTN 103, including: GW 109, GW 112, workstation 115, and workstation 118.

The subnet 124 is an example of a typical corporate network configuration. The subnet 124 comprises an ethernet 125 on which nodes, such as workstations 127, 130 and a wireless telephone 133 operate. The subnet 124 is coupled to the PSTN 103 via the router 121, which may perform network address translation or other firewall-forms of security.

The PSTN 136 has a single workstation 139 coupled to it. The workstation 139 accesses the PSTN 136, and is accessed from the PSTN 136, through the workstation's phone number 140. The connection coupling the PSTNs 136, 103 is transparent to the gateways 105 and other network nodes.

The Internet 142 has several nodes coupled to it. The nodes include an AAA 145, workstation 148, and wireless IP phone 151. Of course, there are many other forms of nodes and networks (not shown) coupled to the Internet 142. The nodes shown here are merely exemplary of three forms of nodes to provide some structure for discussion.

During typical GW bootup sequencing, the GWs 105 get their respective static route table information from the AAA 145. Note that the AAA 145 is a server that performs access, authentication, and authorization control, typically for nodes requesting dial-in access to the Internet. In the past, the AAA 145 only had dial-in reachability information, passwords, etc. (See co-pending application Ser. No. 09/281,591 previously referenced). However, for use in the present invention, the AAA 145 also provides a dial-out reachability database 146, which is stored in working memory of the AAA 145. An example of a record in the reachability database 146 is the following:

IP route 1.1.1.0 255.255.255.0 1.1.1.1 name remote__ router, where the first two fields refer to a subnet, and the next fields refer to an address of a remote node, here a router.

In order to manage over-subscription for dial-out service, the GWs 105, in one embodiment, have the following arrangement. GW 1 is a master GW for dial-out routes (i.e., static routes) to network nodes for which GW 1 provides dial-out service. GW2 is a master GW for dial-out routes to network nodes for which GW2 provides dial-out service. The dial-out routes for which each GW is a master corresponds to the dial-out routes in each respective GW's static route table. In one embodiment of the present invention, the AAA 145 has a master copy of all entries in each GW's routing table for each GW that has access to the AAA 145 or is within the AAA 145 service zone, in this case, the Internet 142.

Figure 2:
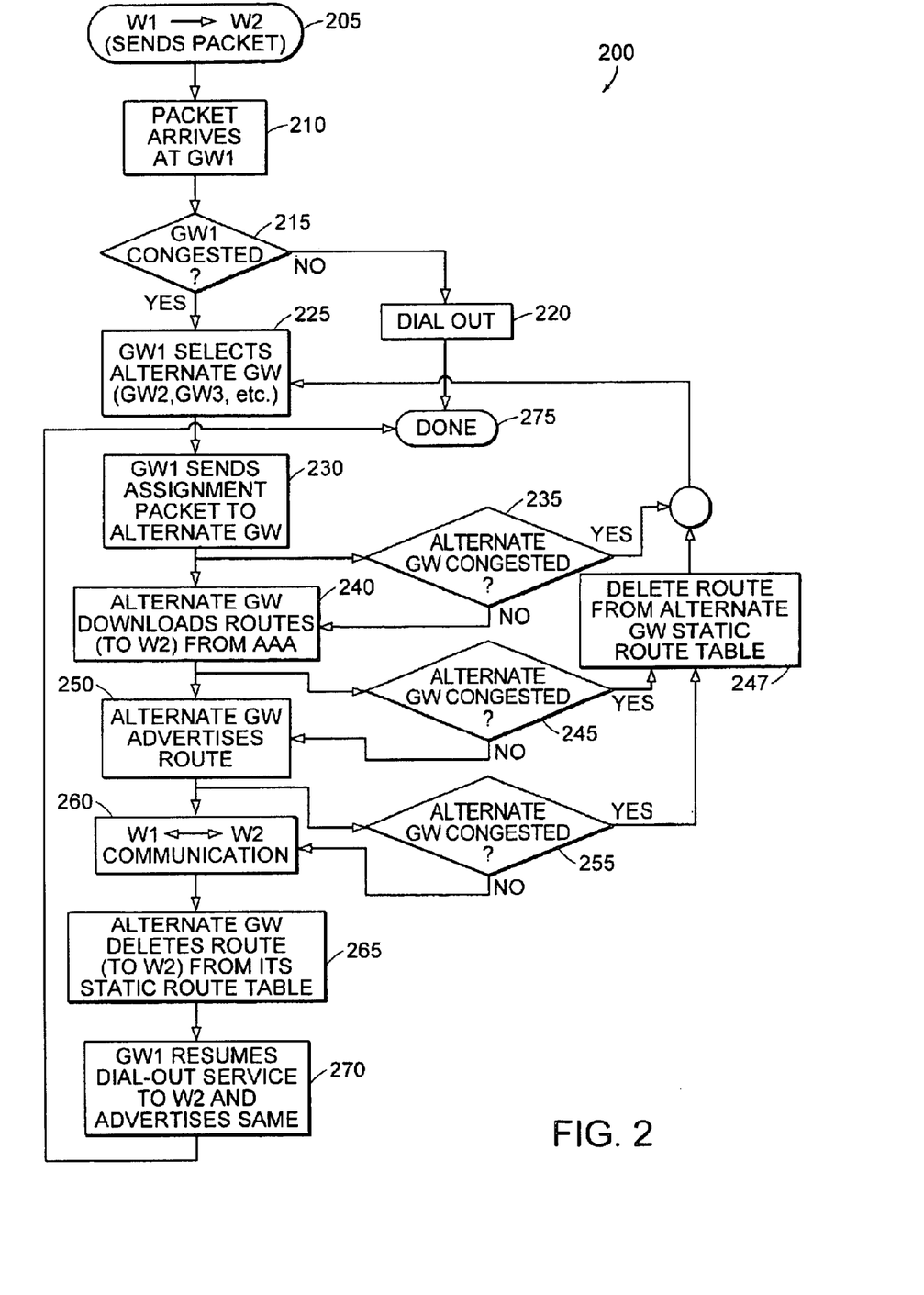
FIG. 2 is a flow diagram of an embodiment of a process of the present invention operating in the example network of FIG. 1.

FIG. 2 is a flow diagram of an embodiment of the present invention relating to a system in which a first gateway (GW1) determines it, or one of the dial-out routes it services, is in a state of congestion. A state of congestion means that (i) all ports in the GW are busy, (ii) the ports that have been allocated to provide dial-out service to the dial-out routes are busy, or (iii) the nodes to which the GW attempts to connect are busy. If GW1 determines itself to be in a state of congestion, it seeks support for the congested dial-out route(s) from another gateway (see application Ser. No. 09/281,591, incorporated by reference herein). In the description provided, it is assumed that the process 200 relates to the example network 100 (FIG. 1), unless otherwise specified.

The process 200 begins when W1 sends a packet to W2, represented by step 205. The packet from W1 arrives at GW1 in step 210. In query 215, GW1 determines whether it, or the dial-out route it provides as service to connect to W2, is in a state of congestion.

In step 215, if GW1 determines that it is not in a state of congestion, then, in step 220, GW1 simply provides dial-out service, through one of its ports to the remote router 121, to W2. The route includes connection through the PSTN 103. The process is complete in step 275.

If, however, in step 215, GW1 determines itself to be in a state of congestion, then processing continues in step 225. In step 225, GW1 selects an alternate GW to provide dial-out service to W2, via the respective dial-out route. In the example network 100, GW1 has only GW2 as an alternate GW. However, there may be three or more GWs located together, or distributed about the Internet 142, that can provide support as alternate GWs.

After selection of an alternate GW in the step 225, in step 230, GW1 sends an assignment packet to the selected alternate GW. The assignment packet includes parameters for the route to W2. In step 240, the alternate GW downloads route(s) to W2 from the AAA 145, based on a subset of the parameters received from GW1 for the route to W2. Note that steps 230 and 240 may be combined if an embodiment is used where GW1 simply transfers the entire dial-out route to the alternate GW, rather than transferring only parameters. To transfer the static routes directly to the alternate GW, GW1 may employ a dynamic routing protocol, such as OSPF (open shortest-path first).

In step 250, the alternate GW advertises the transferred dial-out route to inform other network nodes, including other GWs, that it is presently providing service to the advertised route. Typically, advertisements include a priority level to avoid network contention. For example, if GW1 and GW2 advertise service to the same dial-out route, such as service to W2, then if GW1 advertises the route with a priority level of '1' and GW2 advertises the route with a priority level of '2', then, in a protocol where higher values indicate higher priority, GW2 will be the GW to which the other nodes send packets for dial-out service to W2. Advertising allows packets to be rerouted from one GW to another without altering the contents of the packets, without depending on special behavior of the source of the IP packets, and without relying on dynamic routing between the nodes and the GWs.

In step 260, communication between W1 and W2 occurs through the alternate GW, GW2. This communication continues through the alternate GW until the communication is complete. The first packets (and subsequent packets), issued to GW1 by W1 prior to the dial-out route transfer from GW1 to GW2, are included in the communications in step 260 because these packets are stored in GW1 while GW1 is in a state of congestion. When GW2 advertises the route, GW1 sends the stored packets to GW2 for service of those packets to W2.

In step 265, the alternate GW deletes the dial-out route to W2 from its static route table. In an alternate embodiment, the dial-out route may be returned from GW2 to GW1, or passed to another GW, prior to communication completion between W1 and W2. In yet another embodiment, the transferred route is terminated after a reboot of either of the GWs involved in servicing the dial-out route to W2.

In step 270, GW1 restores the retransferred dial-out route from GW2 and advertises the restored route and a respective priority level. Since GW2 no longer advertises the dial-out route to W2, then all nodes update their respective static route tables with information contained in GW1's advertisements, accordingly. Note that GWs typically advertise their static route table information to other nodes on a regular basis, which informs the other nodes of the current state of each GW's static route table. The process 200 is finished in step 275.

The process 200 also provides for continued checking by the alternate GW of its own state of congestion to ensure that it has not entered a state of congestion before communication between W1 and W2 begins in step 260. The alternate GW's first state of congestion check is done in step 235, after GW1 sends the assignment packet to the alternate GW. If the alternate GW has entered a state of congestion between steps 225 and the end of step 230, then the alternate GW sends GW1 a message indicating that GW1 should select a different alternate GW. If the alternate GW is not in a state of congestion, then processing continues in step 240.

In step 245, the alternate GW does a second check to determine whether it has entered a state of congestion during the process 200. This second state of congestion check ensures the alternate GW has not entered a state of congestion while the alternate GW downloads the routes from the AAA 145, in an embodiment supporting a central static route database. If the alternate GW determined itself to be in a state of congestion, then, in step 247, the alternate GW deletes the transferred route from its static route table. Then, GW1 attempts to select another alternate GW in step 225. If, in step 245, the alternate GW is determined to be not in a state of congestion with respect to dial-out service to W2, then processing continues in step 250.

In step 255, a third test regarding alternate GW congestion is done in step 255. If the alternate GW is determined to be congested in step 255, then, in step 247, the dial-out route is deleted from the alternate GW's static route table. In step 225, GW1 again attempts to select another alternate GW for the subject dial-out route. In step 255, if the alternate GW is determined to be not in a state of congestion with respect to the dial-out route service to W2, then processing continues in step 260, as described above. Of course, if dial-out service to W2 cannot be provided by GW1 or GW2, or any other alternate GW, then W1 receives a "service busy" message.

In an alternate embodiment of the process 200, rather than waiting for a node to request dial-out service to another node, each GW may continually check itself to determine whether its static routes are in a state of congestion and whether support from an alternate GW should be sought at that time, prior to receiving a dial-out service request from another node. In such an embodiment, step 215 becomes the starting point for the process 200, and various minor modifications to the process 200 are employed and may be understood and determined by inspection.

The process 200 may also be used to understand a process occurring inside an alternate GW. The alternate GW receives a dial-out route transfer request from GW1. The alternate GW determines whether to accept GW1's dial-out route transfer request. And, if the alternate GW accepts to provide service to the subject dial-out route, the alternate GW advertises the transferred route and a respective priority level. In one embodiment, the alternate GW accesses the reachability database 146 in the AAA 145 to retrieve complete routing information.

The process of FIG. 2, with little modification, may also be understood to be an embodiment in which a GW or other network node determines the state of congestion of a first GW, GW1 (FIG. 1). For example, GW1 may be fully or partially off-line for any number of reasons, including power outage, system crash, congestion, or no links available. Another GW that is configured to monitor GW1 assesses the state of congestion of GW1 and seeks an alternate GW, optionally including itself, to provide dial-out service to routes unable to be serviced by GW1 due to GW1's state of congestion. In this embodiment, steps 215 through 275 are performed in a GW other than GW1 to accomplish the static route forwarding task. Since, in a state of congestion, GW1's static route table may be inaccessible by another GW, a duplicate GW1 static route table is stored on a server, such as AAA 145, accessible by each potential alternate GW so that GW1's static routes may be forwarded.

Figure 3:
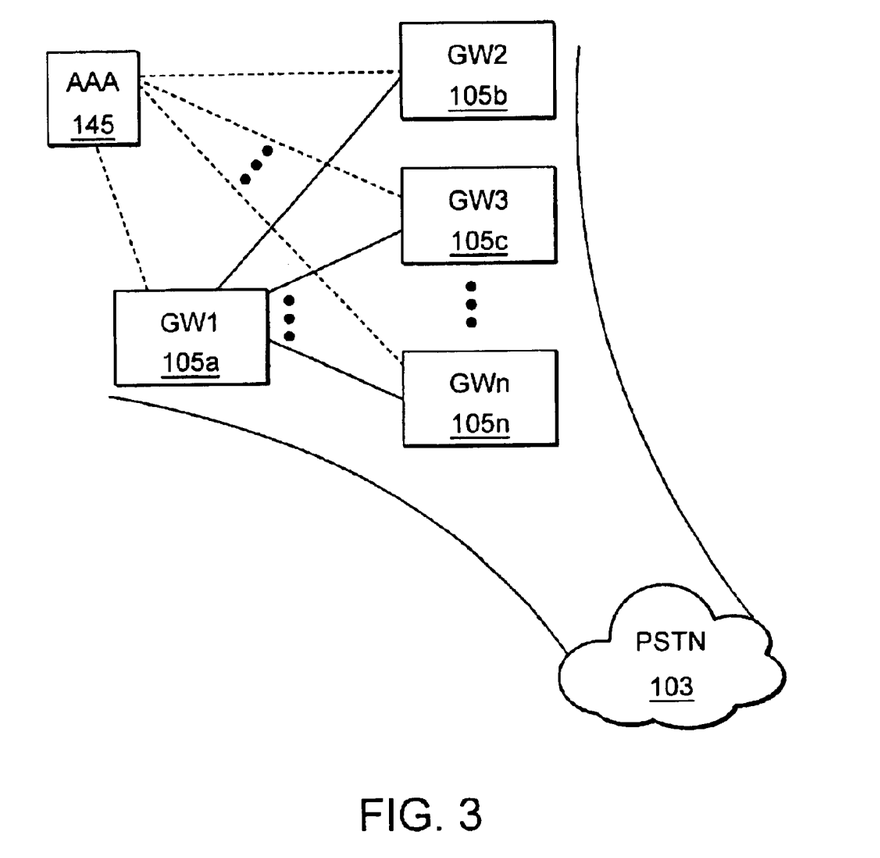
FIG. 3 is a block diagram of multiple gateways interconnected in a manner supporting the process of FIG. 2.

FIG. 3 is a block diagram of an embodiment of a system in which GW1 seeks an alternate GW from among a group of GWs 105b, 105c, . . . , 105n. Each of the GWs 105 has access to the AAA 145. The GWs need not be local to one another (i.e., stacked on the same shelf or even in the same room); the GWs 105 may be coupled to each other across various links and nodes on, for example, the Internet 142 (FIG. 1). After dial-out routes are transferred from one GW to an alternate GW, routing metrics (standard in network communication protocols) associated with each of the dial-out routes are updated by the GWs, accordingly. Updating routing metrics typically includes a GW advertising the updated routing metrics along with the static route and its priority level. Each of the GWs may have access to a single PSTN 103, multiple PSTNs (not shown), or entirely different PSTNs. However, a static route may only be transferred between or among GWs that have access to the destination of the static route via one or more network links, nodes, etc.

Figure 4:
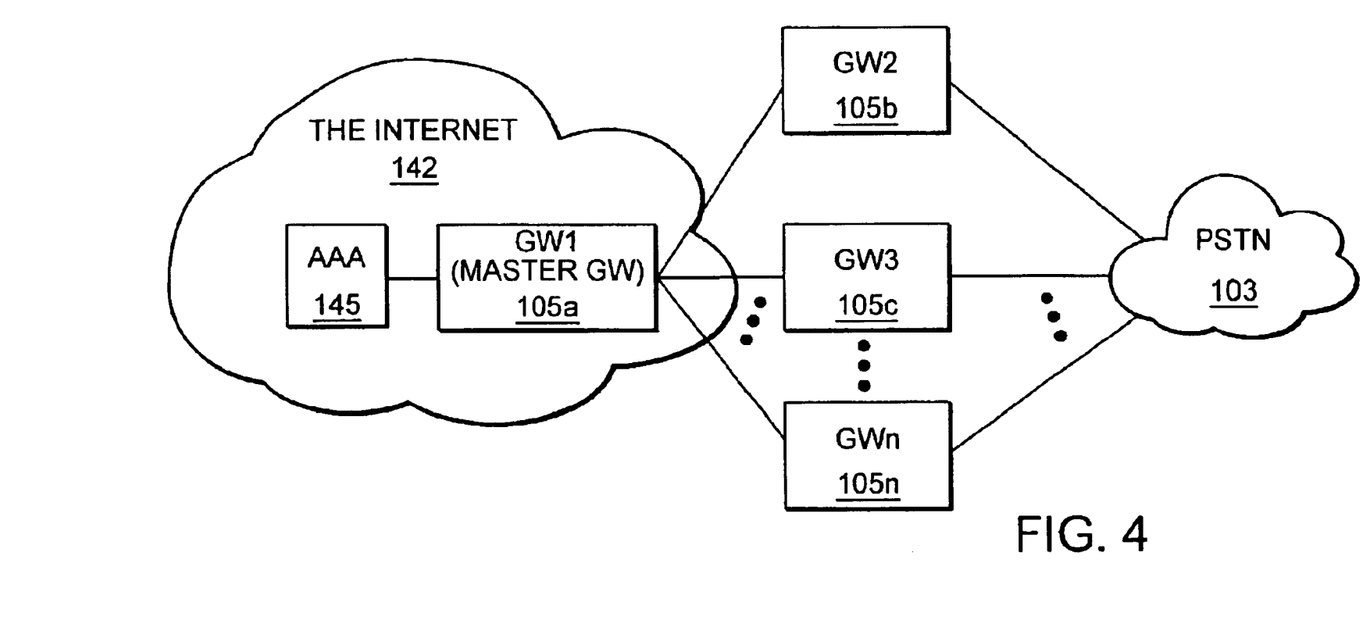
FIG. 4 is a block diagram of multiple gateways interconnected in a manner supporting an alternate embodiment of the process of FIG. 2.

FIG. 4 is a block diagram of an alternate embodiment of a system employing the present invention. In this case, the Internet 142 has a master GW, GW1 105a, that is configured to be in a constant state of congestion with respect to dial-out routes. The Internet 142 may also include the AAA 145 and is connected to the PSTN 103 through one or more GWs, namely GW2 105b, GW3 105c, . . . , GWn 105n.

Because, in this embodiment, GW1 is configured in a constant state of congestion, it continually determines alternate GWs for each of the dial-out routes in its static route table. The prospective alternate GWs include GW2, GW3, . . . , GWn. This arrangement tends to dynamically move various dial-out routes among the alternate GWs and dynamically scale dial-out route service to remote network nodes.

Similar to the embodiment of FIG. 1, in this embodiment, the master GW may transfer a set of parameters to the alternate GWs, which requires the alternate GWs to access the corresponding full dial-out route from the reachability database 146 in the AAA 145. In an alternate embodiment, the master GW transfers the entire dial-out route to the alternate GWs, in which case, the master GW consolidates certain aspects/functions provided by the AAA 145, which may include access, authentication, and/or authorization services.

In the embodiment depicted in FIG. 4, each of the alternate GWs 105b–105n may also be a master for other static routes. Another embodiment may include a second master that has access to each of the alternate GWs shown, and also has access to the AAA 145. Because the present invention is dynamic, it encompasses the possibility of having a wide variety of embodiments of master and alternate GWs to provide dial-out service.

The method of the present invention can be implemented by a processor in the GW that executes computer instructions which are stored on a computer readable medium, such as a ROM, CD ROM, hard disk, or other form of computer storage device While this invention has been particularly shown and described with references to preferred embodiments thereof, it will be understood by those skilled in the art that various changes in form and details may be made therein without departing from the scope of the invention encompassed by the appended claims.

What is claimed is:

1. A method for scaling dial-out services provided by gateways in a data communication network to reduce congestion in the data communication network, the method comprising the steps of:

for network nodes that access a first gateway for dial-out services, determining an availability of ports in the first gateway to provide dial-out services;

transferring dial-out route information, corresponding to at least one dial-out route from the first gateway to a second gateway in the event the ports are not available to provide dial-out sevices by the first gateway to provide services for the network nodes; and after determining a dial-out route is available by the second gateway, updating a routing table in the second gateway and advertising the dial-out route to the network via a routing protocol.

2. The method according to claim 1 further including the step of accessing a central database storing static routes corresponding to the transferred dial-out route information.

3. The method according to claim 2 wherein the central database is stored on a server providing security services.

4. The method according to claim 1, further including the step of:

issuing a request to the second gateway to transfer a dial-out route corresponding to the dial-out route information prior to transferring the dial-out route.

5. The method according to claim 4, further including the step of identifying whether the second gateway chooses to accept the dial-out route.

6. The method according to claim 1, wherein the step of transferring the dial-out route information includes transferring a respective priority level parameter associated with the dial-out route information.

7. The method according to claim 6 further including the step of advertising the transferred dial-out route and a respective priority level by the second gateway to effectuate transferring the dial-out route.

8. The method according to claim 1, wherein the step of transferring further includes transferring at least one transfer termination parameter to limit dial-out route transfer time.

9. The method according to claim 8, wherein the termination parameters include at least one of the parameters: time-to-live, delete-after-complete, or delete-upon-reboot.

10. In a second gateway being used to expand dial-out services in a data communication network, a method for dynamically scaling dial-out services provided by a first gateway to reduce congestion in the data communication network, the method comprising the steps of:

from a first gateway, receiving a dial-out route transfer request including dial-out route information;

determining to accept the dial-out route transfer request;

updating a routing table in the second gateway; and issuing an advertisement via a routing protocol to effectuate the dial-out transfer request to expand dial-out services in the data communication network.

11. The method according to claim 10 further including the step of asserting the dial-out route information to a respective gateway port in a manner supporting dial-out services.

12. The method according to claim 10 further including the step of assigning a higher priority to the dial-out route than the dial-out route has in another gateway.

13. The method according to claim 10 further including the step of:

accessing a database, having records of routing information for network nodes reachable by the network, for a record corresponding to the transferred dial-out route information.

14. The method according claim 13 wherein the step of accessing the database includes the step of communicating with a server providing security services.

15. The method according to claim 14 wherein the server is an access, authentication, and authorization server.

16. The method according to claim 10 further including the step of receiving a static route transfer duration parameter.

17. The method according to claim 10 further including the step of terminating the transferred route according to at least one termination parameter.

18. The method according to claim 17 wherein the termination parameter includes at least one parameter: time-to-live, delete-after-complete, or delete-upon-reboot.

19. A system for dynamically scaling dial-out services provided by gateways in a data communication network to reduce congestion in the data communication network, the system comprising:
   in the data communications network, a first gateway transferring to a second gateway at least one parameter related to a static dial-out route; and
   the second gateway determining a dial-out route is available and applying the dial-out route corresponding to the transferred parameter via a routing protocol to reduce congestion in the data communication network.

20. The system according to claim 19 further including a server providing a reachability database, the reachability database including static routes accessible by the gateways.

21. The system according to claim 20 wherein the server provides security services.

22. The system according to claim 21 wherein the server is an access, authentication, and authorization server.

23. The system according to claim 19 wherein the second gateway retrieves the dial-out route from the reachability database.

24. The system according to claim 19 wherein the first gateway transfers the static route parameters in response to determining a reduced number of gateway ports being able to provide dial-out route services for a static route corresponding to the static route parameters.

25. The system according to claim 19 wherein the second gateway advertises the transferred dial-out route on the data communication network to effectuate dial-out services for the respective static route.

26. The system according to claim 25 wherein the second gateway includes a dial-out route priority parameter in advertisements about the static route dial-out services to other network nodes.

27. The system according to claim 26 wherein the static route priority parameter is calculated in the second gateway.

28. The system according to claim 26 wherein the static route priority parameter is provided by the first gateway.

29. The system according to claim 26 wherein a server includes the static route priority parameter in a database.

30. The system according to claim 19 wherein one of the gateways terminates dial-out services of the transferred static route by the second gateway.

31. The system according to claim 30 wherein the second gateway terminates the transferred static route based on a termination parameter transferred from the first gateway.

32. An apparatus for dynamically forwarding scaling dial-out services provided by gateways in a data communication network to reduce congestion in a the data communication network, the apparatus comprising:
   means for sharing dial-out gateway routes between at least two gateways including (i) means for determining a dial-out route is available by a given one of the at least two gateways, (ii) means for updating a routing table in the given gateway, and (iii) means for advertising the dial-out route to the network via a routing protocol; and
   means for coordinating priority of dial-out gateway routes between the gateways.

33. The apparatus according to claim 32 wherein said means for coordinating priority of gateway routes informs reachable network nodes of respective gateway routes and corresponding gateway route priorities to reduce data flow congestion in the data communication network.

34. The apparatus according to claim 32 wherein said means for sharing the dial-out gateway routes includes means for transferring a gateway route from a first gateway to a second gateway.

35. The apparatus according to claim 32 wherein said means for sharing dial-out gateway routes includes means for terminating the transferred dial-out route from the second gateway according to a gateway route termination parameter.

36. A method for dynamically providing dial-out services for a first gateway by a network node, the method comprising:
   determining a state of dial-out route services of a first gateway;
   retrieving at least one dial-out route reachable from the first gateway from a central database storing dial-out routes for the first gateway;
   assigning the retrieved dial-out route to a second gateway to provide services to the dial-out route;
   updating a routing table in the second gateway; and
   advertising the dial-out route to the network via a routing protocol.

37. The method according to claim 36 further including the step of re-assessing the state of dial-out route services of the first gateway to restore the retrieved dial-out route.

38. A computer program product comprising:
   a computer usable medium for storing data; and
   a set of computer program instructions embodied on the computer usable medium, including instructions to:
      determine a dial-out route is available by a second gateway;
      transfer a dial-out route from a first gateway to the second gateway in a data communications network;
      update a routing table in the second gateway; and
      effectuate the dial-out route via a routing protocol by the second gateway to reduce congestion for nodes in the data communications network.

39. The computer program product according to claim 38 wherein the set of computer program instructions further includes instructions to terminate dial-out route services of the transferred dial-out route by the second gateway.

* * * * *

UNITED STATES PATENT AND TRADEMARK OFFICE
CERTIFICATE OF CORRECTION

PATENT NO. : 6,738,824 B1
DATED : May 18, 2004
INVENTOR(S) : Dana Blair

It is certified that error appears in the above-identified patent and that said Letters Patent is hereby corrected as shown below:

Title page,
Item [63], Related U.S. Application Data, delete "This application is related to U.S. Patent Application entitled "Method and Apparatus Providing Dial On Demand Scaling," by Dana Blair, filed March 30, 1999, Application No. 09/281,591 incorporated herein in its entirety by reference herein." and insert
-- This application is continuation of U.S. Patent Application No. 09/281,591, filed March 30, 1999, entitled "Method and Apparatus Providing Dial On Demand Scaling." The entire teachings of the above application are incorporated herein by reference. --

Signed and Sealed this

Twelfth Day of October, 2004

JON W. DUDAS
*Director of the United States Patent and Trademark Office*